(No Model.)
W. BURY.
VALVE AND VALVE GUIDE.
No. 247,609. Patented Sept. 27, 1881.
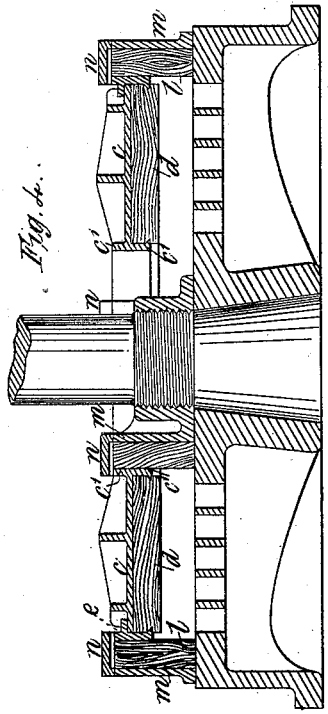
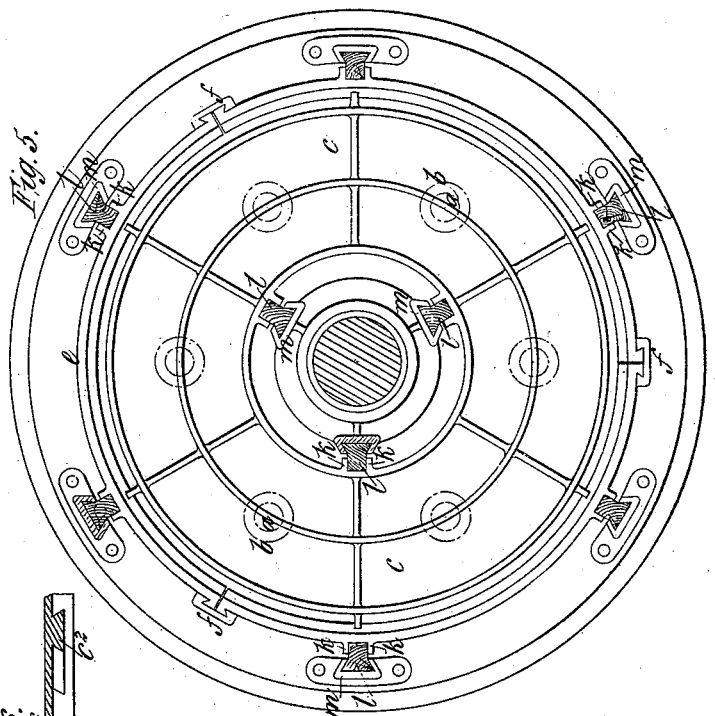
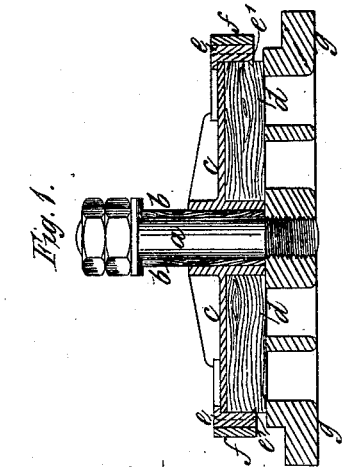
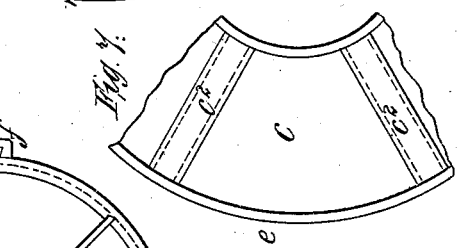
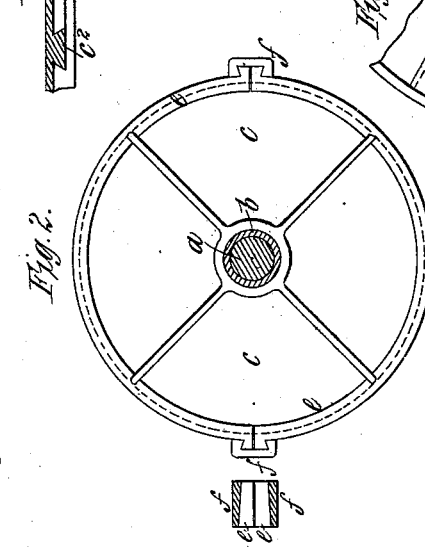
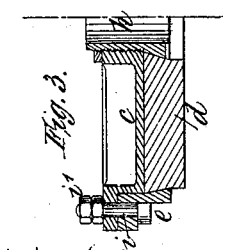
Witnesses
Charles C. Stetson
Charles R. Searle.
Inventor
William Bury
by his attorney
Thomas D. Stetson

UNITED STATES PATENT OFFICE.

WILLIAM BURY, OF LONDON, GREAT BRITAIN.

VALVE AND VALVE-GUIDE.

SPECIFICATION forming part of Letters Patent No. 247,609, dated September 27, 1881.

Application filed June 7, 1881. (No model.) Patented in England November 23, 1880.

*To all whom it may concern:*

Be it known that I, WILLIAM BURY, a subject of the Queen of Great Britain and Ireland, residing at New London street, Mark Lane, in the city of London, Kingdom of Great Britain and Ireland, have invented new and useful Improvements in Valves and Valve-Guides for the Air and Circulating Pumps of Marine Engines, which improvements are applicable also to valves for other purposes, (for which I have obtained a patent in Great Britain, No. 4,852, bearing date November 23, 1880,) of which the following is a specification.

According to my invention I construct valves for the air and circulating pumps of marine engines, and also valves for various other purposes, with removable faces of material—such as cork, wood, or the like—and peculiar means for compressing and holding such removable faces in their places, and also I provide the guides of such valves with lignum-vitæ faces.

In one construction of valve according to my invention (applicable especially to valves of large size) the valve-body is in the form of a ring or disk constructed with radial ribs formed to receive between every two of them a segment of cork or other material.

The inner circumference of the ring or disk is provided with a rim or annular wall that constitutes an abutment for the inner ends of the segments, and I tighten up or force home all the segments by means of a fastening-ring, (it may be a compound ring,) that serves also for holding the whole of the segments in their respective places.

The radial ribs are or may be so shaped that the space between two of them and their ring or disk is of a dovetail or equivalent form, to assist in keeping the segments or faces in place.

In small valves the radial ribs may be dispensed with.

It will also be obvious that valves may be constructed in various other ways on the principle of my invention, as hereinabove set forth— that is to say, with metallic bodies, renewable faces of cork, wood, or the like, and rings or equivalent means for retaining the said faces in place.

When circular guide-rods are employed I cover them with ferrules of lignum-vitæ, and when the guides are of other forms I make therein recesses (preferably of dovetail section) wherein I fit lignum-vitæ faces of suitable form to guide the valves as required.

It will be evident valves according to my invention may, under different modifications, be used for a large variety of purposes, and that by my invention the faces may be renewed at moderate cost.

Referring to the accompanying drawings, Figure 1 is a vertical section, and Fig. 2 a plan, of a small valve constructed according to my invention. $d$ is the renewable face of the valve, of cork, wood, or the like, carried by the metal frame $c$, and compressed by means of the adjustable ring $e$, which is made with a tapered inwardly-projecting annular part, $e'$, to aid in firmly holding the material $d$, and is tightened around the outer edge of the material $d$ by a wedge-piece or wedge-clamp, $f$, fitting over lugs $e^2$ on the rings $e$. $a$ is a brass bolt screwed into the valve seat or facing $g$, and surrounded by a lignum-vitæ ferrule, $b$, which forms a guiding-surface to direct the motion of the frame $c$.

Fig. 3 illustrates, in section, a modification in which the inner edge of the material $d$ butts against a cone-headed tightening-screw, $h$, and the tightening-ring $e$ is secured by bolts $i$, passing through lugs in the ring $e$ and frame $c$, and tightened up by nuts $i'$, thus firmly securing the material $d$ in contact with $c$.

Fig. 4 is a vertical section, and Fig. 5 a plan partly in section, of a large annular valve constructed according to this invention and suitable for many existing pumps. $d$ is the renewable face, of cork, wood, or the like, carried by the frame $c$. This frame has a circular flange, $c'$, projecting both above and below its web on its inner circumference, and is divided on its under side into segments by radial ribs $c^2$, Figs. 6 and 7, with inclined sides. Between these ribs and supported by them, as in V-grooves, are fitted the pieces of cork, wood, or the like, which form the valve-face, each being formed with edges made to match the dovetailed ribs $c^2$. $e$ is an adjustable ring constructed in segments, and tightened to compress the renewable valve-face between radial ribs and to secure it to the frame, as before described. The valve is guided in its rise and fall by projections $k\,k$, which form slides working on the lignum-vitæ faces $l$, held by the dovetail-shaped castings $m\,m$ and caps $n\,n$. The caps $n\,n$ form stops to limit the lift of the valve.

If preferred, these valves can be guided by brass bolts or studs with lignum-vitæ ferrules, as described with reference to Figs. 1 and 2, such bolts and ferrules being introduced to extend up from the grated seat, as indicated by dotted lines at $a\,b$, Fig. 5.

Annular valves, such as described with reference to Figs. 4 and 5, may be modified as regards the arrangements for holding in place the material $d$, which arrangements in such valves may be such as already described with reference to Fig. 3.

In all cases I so construct the renewable faces as to form a covering bearing on the whole area of the face of the grating in the seating, in order to obtain the utmost bearing-surface possible.

What I claim is—

1. In combination with a valve opening and closing by a motion at right angles to its seat, a series of guides, $l$, of lignum-vitæ or analogous wood, combined and arranged to serve as herein specified.

2. A valve opening and closing by a movement at right angles to the seat provided with ribs $c^2$, of dovetail-section, in combination with face-pieces $d$, of wood, engaged therewith, and serving as an elastic face for the valve, as herein specified.

3. In a valve having an elastic facing material, the inclosing-ring $e$, having internal projections, $e'$, and external lugs, $e^2$, in combination with wedge-clamps $f$, serving therewith, as herein specified.

WM. BURY.

Witnesses:
F. J. BROUGHAM,
Clerk to Wm. W. Lloyd Wise, London, S. W.
H. J. TROTTER,
7 Whitehall Place, London, S. W.